(No Model.) 2 Sheets—Sheet 1.
M. H. MADSEN.
WAGON BRAKE.
No. 525,850. Patented Sept. 11, 1894.
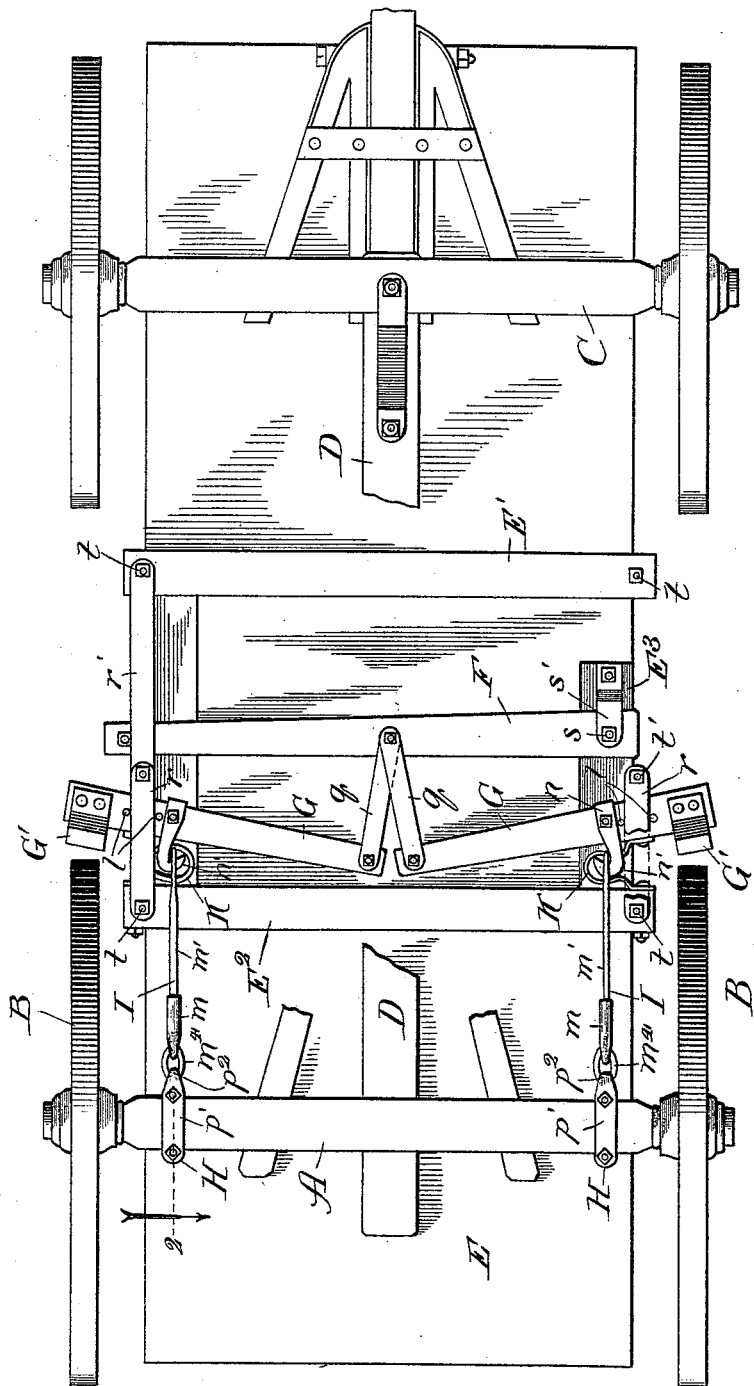
Witnesses:
Inventor:
Mads H. Madsen,
By Dyrenforth & Dyrenforth
Att'ys (No Model.) 2 Sheets—Sheet 2.
M. H. MADSEN.
WAGON BRAKE.
No. 525,850. Patented Sept. 11, 1894.
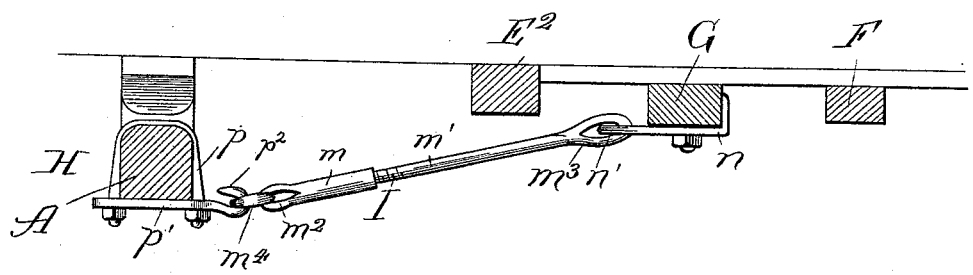
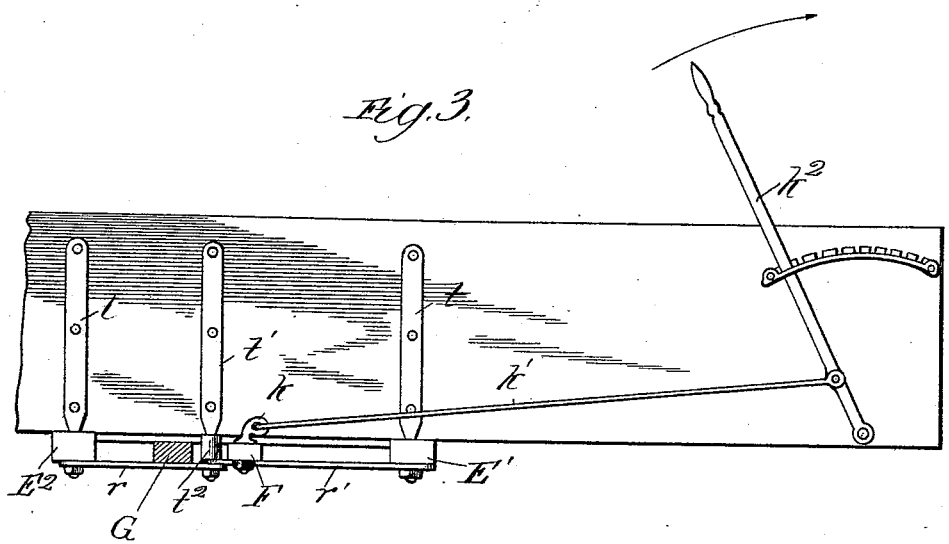
Witnesses:
Inventor:
Mads H. Madsen,
By Dyrenforth & Dyrenforth
Attys.

UNITED STATES PATENT OFFICE.

MADS H. MADSEN, OF KIMBALLTON, IOWA.

WAGON-BRAKE.

SPECIFICATION forming part of Letters Patent No. 525,850, dated September 11, 1894.

Application filed April 5, 1894. Serial No. 506,469. (No model.)

*To all whom it may concern:*

Be it known that I, MADS H. MADSEN, a citizen of the United States, residing at Kimballton, in the county of Audubon and State of Iowa, have invented a new and useful Improvement in Wagon-Brakes, of which the following is a specification.

My invention relates to improvements in brakes of the class in use, more especially, upon farm-wagons.

My object is to provide brake-mechanism of an improved construction rendering it particularly simple and durable; which will serve to keep the brake-shoes from the wheels when the wagon is ascending a grade and permit ready removal of the wagon box from the wagon frame when desired.

In the drawings—Figure 1 is a bottom plan view of a wagon and wagon box, parts being broken away, and showing my improved brake mechanism in place; Fig. 2, a longitudinal section showing a detail of the construction enlarged; and Fig. 3, a broken side elevation of a wagon box.

Of the running gear of the wagon illustrated, A is the rear axle; B B, the rear wheels; C, the front axle, and D the reach.

E is the wagon box. On the under side of the wagon box, and firmly secured thereto by means of strap bolts $t$ $t$, which extend up the sides of the wagon box, are cross beams E' E$^2$; and at one side between the said beams is a strip or block E$^3$.

F is a brake-lever operating-bar held pivotally in place at one end against the block E$^3$ by a bolt passing through a clip $s'$.

On one side of the box is a plate or bar $r$ secured by means of the strap bolt $t$ against the under side of the end of the beam E$^2$, and fastened at its other end to a strap bolt $t'$, a washer $t^2$ being provided between the base of the wagon box and bar $r$, to hold it in a position parallel with the said base. On the opposite side of the wagon box is a similar bar $r$, similarly held in place, and extending from its end to the beam E' is a bar $r'$, also parallel with the base of the wagon box.

The brake-lever operating bar F at its free end portion slides upon the bar $r'$ and extends beyond the side of the wagon-box.

G G are brake levers provided at their outer ends with brake shoes G', and pivotally connected at their inner ends with links $q$ $q$, which at their opposite ends connect pivotally with the operating-bar F between the ends of the latter. On the rear axle near its opposite ends are clips H each comprising a U-shaped strap $p$ with threaded ends and a plate $p'$ held by nuts upon the threaded ends of the straps against the under surface of the axle. At its forward end each plate $p'$ is formed into a hook $p^2$. The levers G near their outer ends extend between the bars $r$ and base of the wagon box and slide upon the bars $r$. On the levers adjacent to the bars $r$ are clips $n$, of the construction shown, bolted in place, and formed at their ends into hooks $n'$.

I I are adjustable tie-rods each comprising a socket-piece $m$, the socket of which is threaded, and a rod $m'$ threaded at one end portion to enter and engage the threads of the socket-piece. The opposite ends of the tie-rod I are formed into eyes $m^2$ $m^3$, respectively, and passing through the eyes $m^2$ are chain-links $m^4$. The tie-rods I may be lengthened and shortened, by screwing the rod $m'$ into or out of the socket-piece $m$, and they are placed in position by passing the links $m^4$ over the hooks $p^2$ at the rear axle, and passing them at their eyes $m^3$ over the hooks $n'$ on the brake-levers. Extending downward from the brake levers, on opposite sides of the bars $r$, are guide pins $l$, which, by engaging the bars $r$, prevent longitudinal play of the brake levers without interfering with their lateral play.

Confined between the levers G and the beam E$^2$ are springs K K, preferably of the U-shape shown, which tend normally to press the brake shoes G' in the direction away from the wheels B. On the free end of the operating-bar or lever F is an eye-bolt $k$ from which extends a rod $k'$ to the operating-lever $k^2$.

In practice the springs K tend to maintain the brake shoes G' clear of the wheels B. To apply the brakes the operating lever $k^2$ is thrust forward, drawing with it the rod $k'$, and moving the free end of the lever F in the forward direction. Through the medium of the links $q$ the levers G G are swung against the resistance of the springs K upon the fulcrums, afforded by the tie-rods I, to press the brake-shoes against the wheels B.

The main wear in brake-mechanism of this class is at the fulcrums of the brake-levers G, and where the fulcrums are provided by pins or bolts passing through them into stationary parts of the wagon, the wear upon the pins, or the holes into which they pass, in a comparatively short time makes the brakes inoperative. It will be readily understood that as the fulcrums are close to the brake-shoes comparatively little wear at the fulcrums will prevent the operating levers from pressing the brake-shoes with desired force against the wheels. In my construction any wear upon the fulcrums may be taken up by screwing the rod $m'$ into the socket piece.

When it is desired to remove the wagon box from the running gear all that is necessary to do in my construction is to detach the tie-rods I from the hooks, with which they connect, the hooks $n'$ being made shallow, as shown, for the purpose. As all the rest of the brake-mechanism is upon the wagon box it is removed with the latter. The guide bars $r$ and $r'$ are important, as they hold the free end portions of the levers against the under side of the wagon box, and prevent their being pressed downward by the wheels when brakes are applied. The springs maintain the parts tight and prevent their rattling when the wagon is in motion.

What I claim as new, and desire to secure by Letters Patent, is—

1. The combination with the running gear and box of a wagon, of brake-mechanism comprising a lever F fulcrumed at one end, means for operating said lever, brake-levers G, links connecting the inner ends of the levers G with the lever F, clips H on the rear axle presenting hooks $p^2$, clips $n$ on the levers G presenting hooks $n'$, and tie-rods I at opposite ends engaging the said hooks, substantially as described.

2. The combination with the running gear and box of a wagon, of brake-levers G, clips $n$ on the levers G presenting hooks $n'$, tie-rods I at one end connected to the rear-axle and at their opposite ends engaging the hooks $n'$ and forming the fulcrums of the levers G, springs between the wagon-box and levers G, tending normally to press the brake-shoes away from the wagon-wheels, and operating mechanism connected with the levers G, for turning them against the resistance of the springs, substantially as described.

3. The combination with the running-gear and box of a wagon, of brake-mechamism, comprising, in combination, the lever F fulcrumed at one end, means for operating said lever, brake-levers G, links $q$ connecting the levers G with the lever F, supporting bars $r$ for the levers G, guides $l$ on the levers G at the bars $r$, springs K between the wagon-box and levers G, clips H on the rear axle presenting hooks $p^2$, clips $n$ on the levers G presenting hooks $n'$, and tie-rods I engaging at opposite ends with the hooks $p^2$ $n'$, the whole being constructed and arranged to operate substantially as described.

MADS H. MADSEN.

In presence of—
  HANS MADSEN,
  KARL SKRÓDER.